United States Patent [19]
Richardson, Jr.

[11] Patent Number: 5,721,393
[45] Date of Patent: *Feb. 24, 1998

[54] TRANSMISSION LINE SPACER-DAMPER DEVICE

[76] Inventor: Albert S. Richardson, Jr., 3 Wingate Rd., Lexington, Mass. 02173

[*] Notice: The term of this patent shall not extend beyond the expiration date of Pat. No. 5,362,920.

[21] Appl. No.: 593,073

[22] Filed: Jan. 29, 1996

Related U.S. Application Data

[63] Continuation-in-part of Ser. No. 274,954, Jul. 14, 1994, Pat. No. 5,488,197, which is a continuation of Ser. No. 61,183, May 13, 1993, Pat. No. 5,362,920.

[51] Int. Cl.$^6$ .................. H02G 7/12; H02G 7/14
[52] U.S. Cl. ..................... 174/42; 174/146
[58] Field of Search ..................... 174/42, 146

[56] References Cited

U.S. PATENT DOCUMENTS

| | | | |
|---|---|---|---|
| 3,032,605 | 5/1962 | Gerlach et al. | 174/40 R X |
| 3,659,034 | 4/1972 | Rawlins et al. | 174/42 |
| 3,971,881 | 7/1976 | Hawkins | 174/40 R |
| 4,421,959 | 12/1983 | Chen et al. | 200/16 A |
| 4,777,327 | 10/1988 | Richardson, Jr. | 174/42 |
| 5,362,920 | 11/1994 | Richardson, Jr. | 174/42 |
| 5,488,197 | 1/1996 | Richardson, Jr. | 174/42 |

OTHER PUBLICATIONS

McGraw-Hill, "Transmission and Distribution—Anti-Galloping Devices: Now an Accepted Solution," Reprinted from *Electrical World*, (Jan., 1993).

Hirai, et al., "Four-Bundled Conductor Spacer," Nov., 1970, pp. 68–75 (174–146) (Japanese language only).

*Primary Examiner*—Hyung S. Sough
*Attorney, Agent, or Firm*—Hamilton, Brook, Smith & Reynolds, P.C.

[57] ABSTRACT

A spacer damper for providing proper separation and effective vibration damping of subconductors includes a structural hoop about which clamps are positioned at equal intervals. The clamps allow attachment of the spacer damper to the subconductors and are separated by springs about the hoop and between the clamps. The hoop and subconductors are positioned substantially in the same plane to reduce corona effects. Additionally, a suspension clamp is securable to an insulator of a tower to support a subconductor.

12 Claims, 7 Drawing Sheets

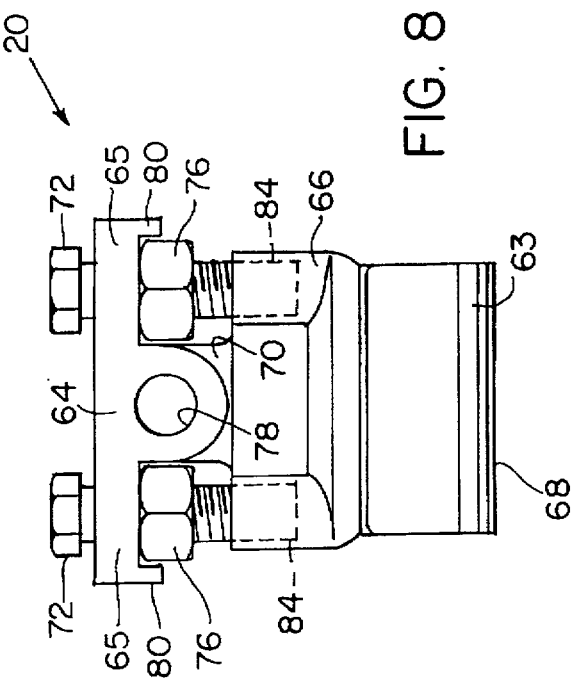
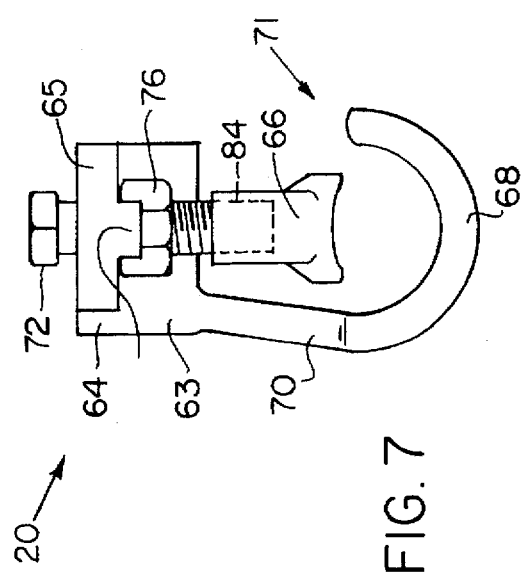
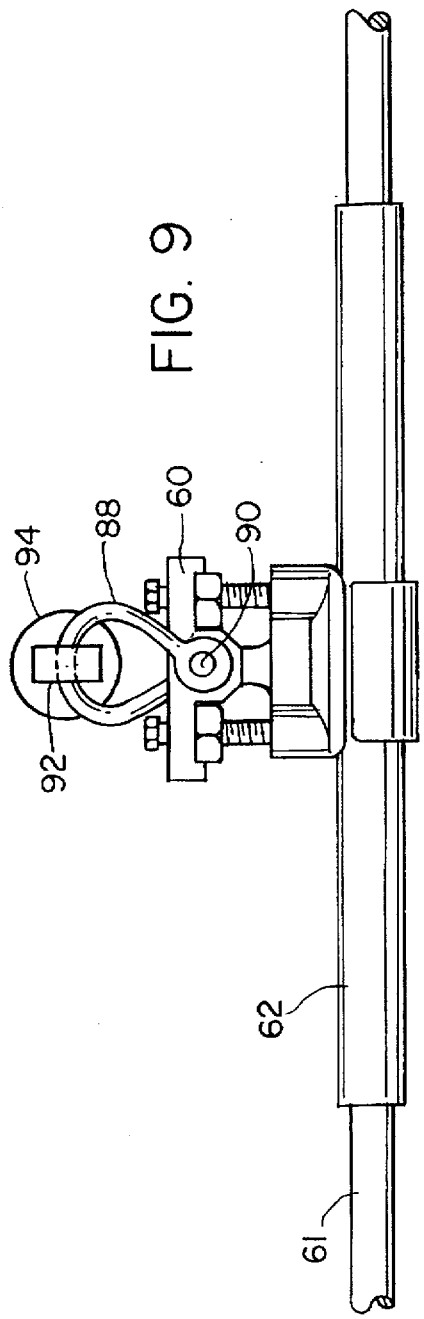

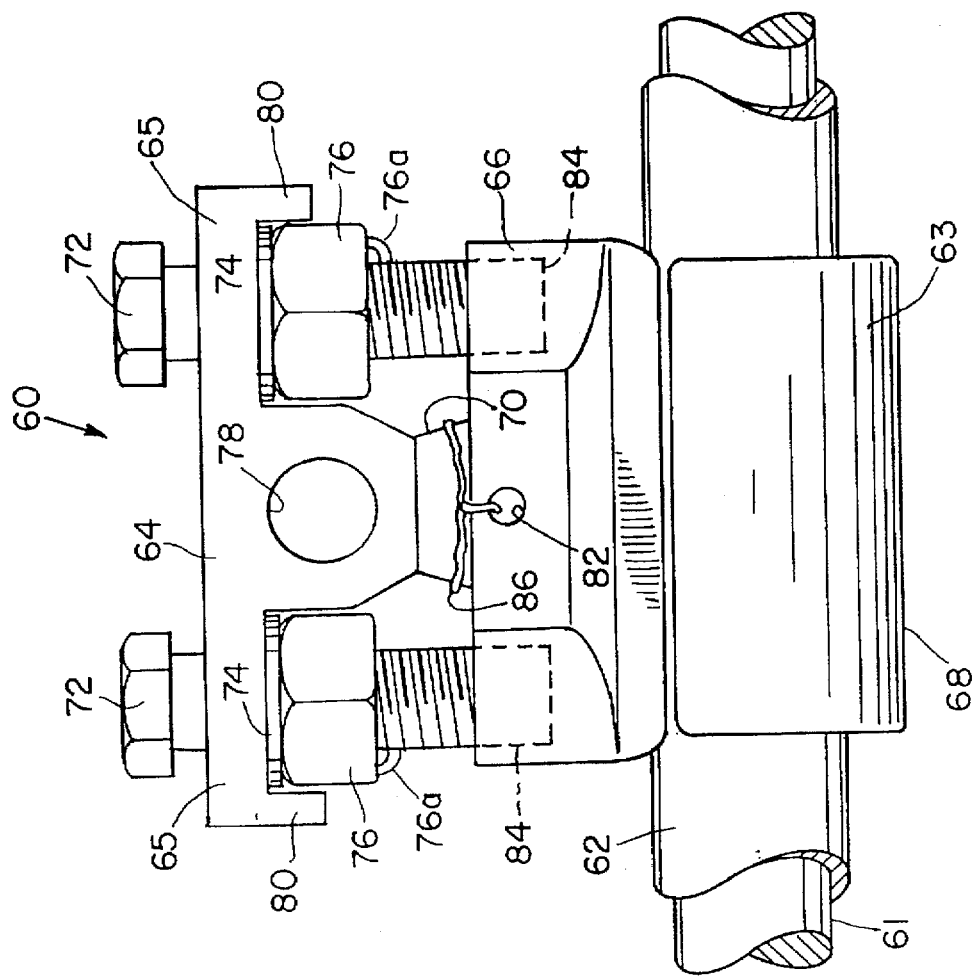
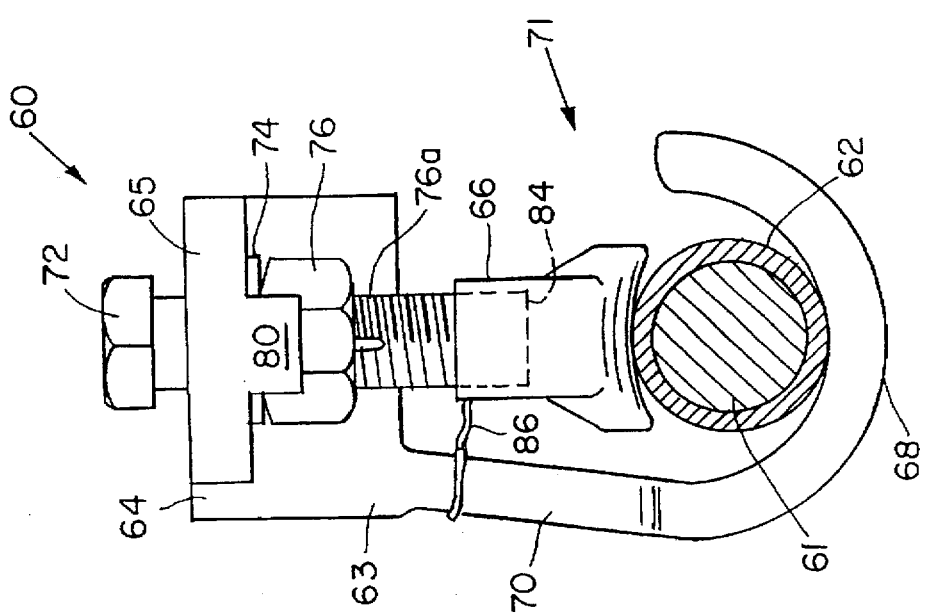
FIG. 11
FIG. 10

TRANSMISSION LINE SPACER-DAMPER DEVICE

RELATED APPLICATIONS

This application is a continuation-in-part of application Ser. No. 08/274,954 filed Jul. 14, 1994, now U.S. Pat. No. 5,468,197, which is a continuation of U.S. Ser. No. 08/061,183 filed May 13, 1993, now U.S. Pat. No. 5,362,920, both are incorporated herein by reference in their entirety.

BACKGROUND OF THE INVENTION

Transmission lines that are used to transmit electrical energy are often characterized as, high voltage lines, extra high voltage (EHV) lines, and ultra high voltage (UHV) lines. The voltage levels in each category are approximately, under 300 kilovolts (kV), 300 kV to 500 kV, and over 500 kV, respectively. Transmission lines that are in the category of EHV and UHV are referred to as bulk power transmission lines, meaning that power is transferred along the lines from a generating point to a distribution point over great distances which can be as much as several hundred miles. Another feature of such power delivery is that total power is in the range of hundreds of megawatts delivered to the distribution point or load point. It is not uncommon to see several transmission lines, consisting of three phase conductors each, passing over a common right-of-way from the generation point to the load point. These lines may be located in open farmlands, or hilly terrain, or up and down a mountainside. In any case the uninterrupted delivery of power to the load point is a primary concern. Economy of delivery is also a major concern in the design of the line.

One way of achieving economical design at the EHV and UHV voltages is to cause the conductors to be bundled. A bundled conductor differs from a single conductor because two or more conductors are tied together by devices known as spacers, or spacer-dampers. These devices are designed to keep the individual wires in a bundle separated by a fixed distance, usually 18 inches. The spacing of the spacer devices from each other along the line is about 200 feet. Hence, a line having a span of 1000 feet will have four spacers, or spacer-dampers along its span length. Since there are three phases in a circuit, a single span of 1000 feet will have twelve spacers or spacer-dampers. Therefore, there are approximately fifty spacer units per mile, or five thousand spacer units per 100 miles of line.

Modern spacers are called spacer-dampers because they combine the function of spacing the bundle with the damping of the vibration of the individual wires in the bundle. The individual wires are called subconductors. A typical 500 kV line will have three subconductors per phase in the shape of an inverted equilateral triangle (inverted delta) with 18 inches separating each subconductor. Other lines may have only two subconductors and these are also separated by spacer-dampers at 18 inches, usually in a horizontal plane. Other higher voltage lines may have four subconductors in a square box arrangement separated at 18 inch intervals. A typical line (total) voltage in the case of two subconductors is 345 kV, while a typical line (total) voltage in the case of four subconductors is 765 kV.

There are as many different ways to design spacer-damper devices as there are manufacturers that make them. Competitive cost is always a major concern. Long life in service over a period of twenty years or more is a major concern as well. Most especially, it is desired to provide a spacer-damper that performs effectively to dampen vibration of the subconductors without damaging the individual wires. Another factor which is very important is to provide a device that is easy and quick to install on the line. This usually means that a quick-acting, positive-locking bolt or clip is needed. This is especially needed when the spacer-damper units are to be contracted on the basis of lowest cost.

SUMMARY OF THE INVENTION

The present invention spacer-damper device (i) provides the necessary spacing of subconductors from each other while allowing the subconductors to vibrate without causing damage to the subconductors, and (ii) reduces corona effects when spacing two high voltage subconductors apart (above 500 kV). In order to reduce corona effects, the present invention provides a spacer-damper device for spacing two subconductors from each other that includes a hoop formed of rigid material, with first and second articulating clamps spaced along the hoop approximately opposite to each other for gripping the two subconductors in such a manner that the hoop and subconductors are positioned substantially along the same plane. The clamps are capable of sliding along the hoop and rotating about the hoop. First and second springs about the hoop and between the clamps separate the clamps along the hoop.

In preferred embodiments, the hoop and the subconductors lie along a horizontal plane with the subconductors being spaced about 22 inches apart. Rotation of each clamp is resisted by friction forces on the clamp provided by positioning washers about the hoop between each clamp and spring. Lateral movement of each subconductor is dampened by rotation of the corresponding clamp about the hoop with the rotation of the corresponding clamp being resisted by the friction forces exerted on the corresponding clamp. Longitudinal movement of each subconductor is dampened by a sliding action of the corresponding clamp about the hoop. The sliding of the corresponding clamp is resisted by the springs spaced between the clamps. Longitudinal movement of the subconductors can be in directions tangential to the hoop or along the circumference of the hoop.

The present invention also provides a clamp for gripping a subconductor. This clamp includes a clamp body comprising a mounting portion with a clamp arm extending from the mounting portion. The clamp arm terminates in a cradle which receives the subconductor. A keeper traps the subconductor within the cradle. First and second bolts are employed for securing the keeper against the subconductor. The bolts pass through the mounting portion of the clamp body.

In one preferred embodiment, the present invention clamp is employed on a spacer-damper device. In another preferred embodiment, the present invention clamp is a suspension clamp for supporting a subconductor that is hung from an insulator of a tower.

In preferred embodiments of the present invention suspension clamp, the clamp arm is J-shaped which provides an entry way to the cradle on a side of the clamp body opposite to the clamp arm. This enables the subconductor to be slipped into the cradle during installation. The simple design of the present invention suspension clamp allows subconductors to be hung from electrical towers more easily and in less time than with prior art suspension clamps.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 7 is an end view of another preferred clamp.

FIG. 8 is a side view of the clamp of FIG. 7.

FIG. 9 is a side view of the present invention suspension clamp that is suspended from an insulator on a tower for supporting a subconductor.

FIG. 10 is an enlarged end view of the suspension clamp depicted in FIG. 9.

FIG. 11 is an enlarged side view of the suspension clamp depicted in FIG. 9.

DETAILED DESCRIPTION OF THE PREFERRED EMBODIMENT

Figure 1:
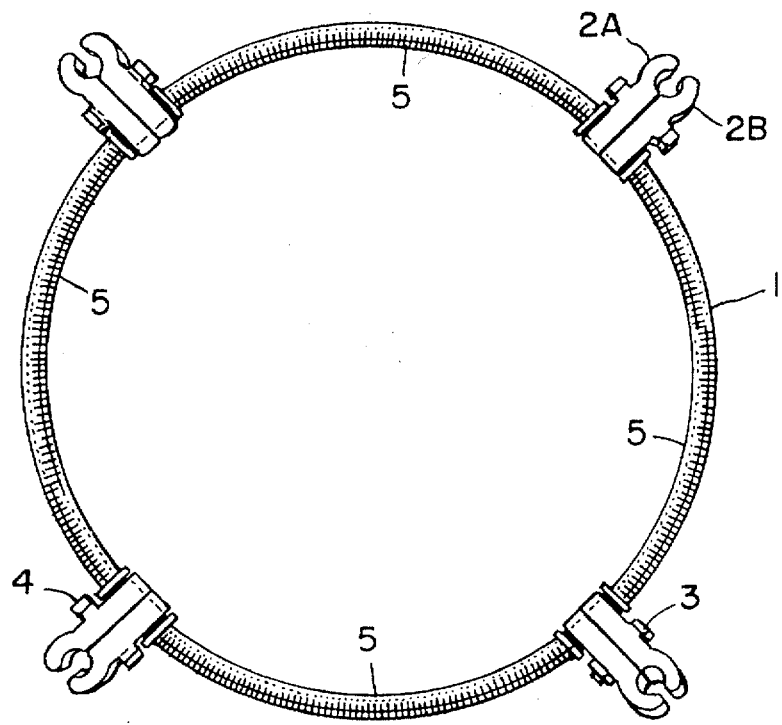
FIG. 1 is a view looking along the line of a four (quad) bundle line showing the present invention based on a two foot square are bundle configuration.

Pertinent portions of the parent applications follow for convenience. Details of the present invention will then be more easily understood as described thereafter.

An apparatus for spacing two or more subconductors in a span of several subconductors is shown in FIGS. 1, 2, 3, and 4A–4C. Included therewith are means to dampen vibration of the subconductors. A structural component is formed in the shape of a closed hoop 1. Before fixing the ends of the hoop 1 by welding, clamps 2A and 2B are threaded along the hoop together with springs 5, rubber washers 6 and flat washers 7. Spacing of the subconductors is controlled by the position of the clamps 2A and 2B around the hoop.

A single bolt 3 is used to fix the clamps 2A and 2B to the subconductor by tightening to a locknut 4 which in turn is held in place by a retainer 8 which prevents the nut from turning. Rubber washers 6 are pressed against the sides of the clamps 2A and 2B by precompressed springs 5 bearing against flat washers 7.

If vibration is occurring in one or more of the subconductors due to wind or other causes, the bending of the subconductor against the clamps 2A and 2B induces rotation of the clamps 2A and 2B about the hoop 1. Such rotation is resisted by shearing stress in the rubber washers 6 or by dry friction between the flat washers 7 and the springs 5. This resistance is one form of damping that occurs.

Another form of damping is caused by the movement of the subconductor perpendicular to the hoop 1. This action causes the clamps 2A and 2B to move a small amount in the radial direction against the hoop 1. The resulting kinetic impact creates energy loss which causes damping.

Another form of damping is caused by the movement of the subconductor tangentially along the hoop 1. This action causes the clamp 2A and 2B to compress the spring 5 or allow the spring 5 to extend itself from its initial compression. In either case energy is stored and released during a cycle of vibration. The energy that is stored and released is accompanied by energy loss which causes damping.

A further form of damping is provided by movement of the spring 5 against the hoop 1 in a radial direction. This action creates kinetic impact between the spring 5 and the hoop 1 during a cycle of vibration. Such impact causes damping to occur.

The above described damping action will occur in any number of subconductors from two to four to six or more. The only difference between spacer-damper parameters is the number of subconductors and the diameter of the hoop. Individual design of the product may be achieved by varying the diameter of the hoop, the diameter of the round rod that forms the hoop, the size of the clamps that attach to the subconductor, the number of clamps, the spacing of the clamps, the composition of the material (common grade steel etc.), and the design of the clamp itself.

Figure 2:
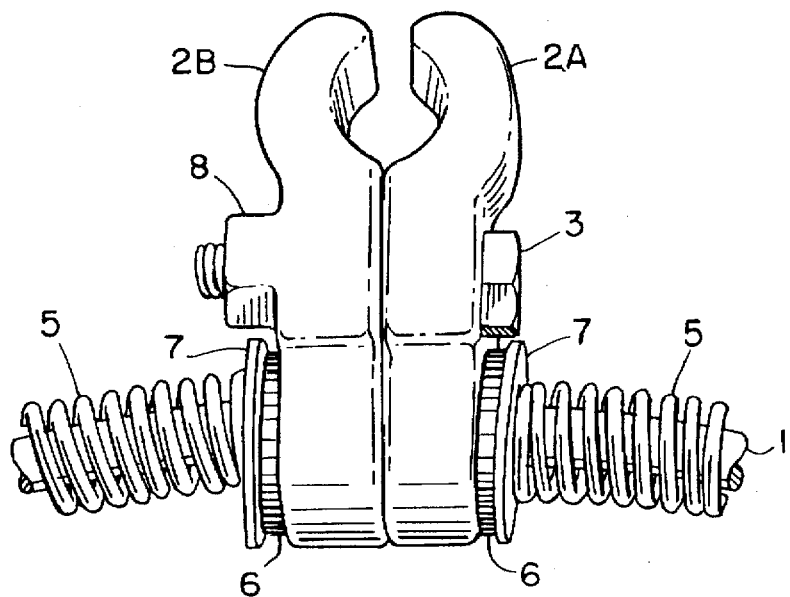
FIG. 2 is a close-up view of the aluminum clamps illustrating the single bolt keeper, the nut retainer (on the left side), the rubber washer grommets between the clamps and the flat steel washers, and the compressed springs over the steel hoop.

An UHV embodiment of the parent applications is depicted in FIGS. 3 and 4A–4C and is used for UHV voltage levels above 620 kV. In this form the clamp 9 consists of a single piece of aluminum casting shaped in a way to gradually penetrate the electric field formed by the subconductors. A subconductor bears against the inside of the clamp 9 and is fixed in place by a keeper 10. The keeper 10 is shaped to allow its insertion after the subconductor is in place. A slot 15 is provided in the clamp 9 to allow the keeper 10 to slide under the subconductor until the keeper 10 is prevented from further sliding by the larger portion 16. This larger portion 16 is also recessed to receive a bolt 14 which bears against the keeper 10 forcing the subconductor to bear against the underside of the clamp 9. The bolt 14 is held in place by a captive locknut 13 which is further held by retainer 12. The clamp 9 is positioned along the hoop 1 in the same manner as the previous clamps 2A and 2B (FIGS. 1 and 2). The clamp 9 has a core 11 which allows free rotation of the clamp 9 about the hoop 1 during any type of subconductor vibration. All of the four forms of vibration damping previously identified will be active with the clamp 9.

Figure 5:
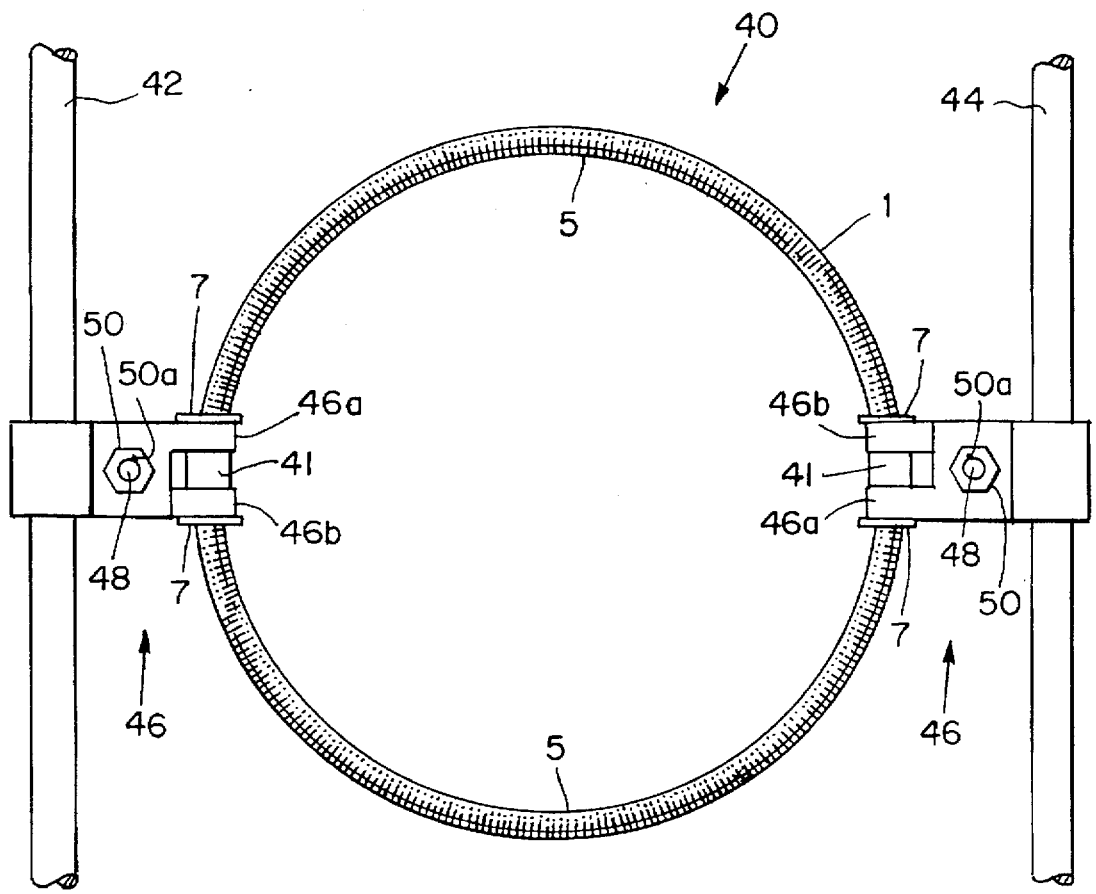
FIG. 5 is a plan view of another preferred spacer-damper device.

Applicant has discovered that when spacing two high voltage subconductors apart, a spacer-damper having portions which extend outside the plane between the two subconductors is subject to corona effects. Referring to FIG. 5, spacer-damper 40 is a preferred embodiment of the present invention that is employed for spacing two subconductors 42 and 44 apart from each other in such high voltage situations (above 500 kV) in order to reduce corona effects. Spacer-damper 40 includes a rigid hoop 1 (like that of the spacer-dampers in the related applications, i.e. FIG. 1) preferably made of steel with two clamps 46 fitted about hoop 1 which are spaced apart from each other on opposite sides of the hoop 1 by springs 5. A steel washer 7 is sandwiched between each spring 5 and clamp 46. Although spacer-damper 40 does not typically have rubber washers, rubber washers can alternatively be employed between clamps 46 and washers 7 such as depicted in FIG. 2. Each clamp 46 consists of a clamp half 46a and 46b. The rear part of clamp halves 46a and 46b are not as wide as the front part and are separated from each other by a spacer 41. Spacer 41 is preferably a single polymeric member but alternatively can include multiple steel washers. Spacer-damper 40 differs from the spacer-dampers of the parent applications depicted in FIGS. 1 and 3 in that clamps 46 grip subconductors 42 and 44 to hold them substantially in the same plane as hoop 1. This greatly reduces corona effects in high voltage situations in comparison to the spacer-dampers of FIGS. 1 and 3 which position the hoop in a plane that is perpendicular to the subconductors. Spacer-dampers which extend outside or beyond the plane between the subconductors increase corona effects because of high voltage gradient.

Spacer-damper 40 also increases the overturning angle of the bundled subconductors 42 and 44 since the clamps 46 are capable of both sliding along and rotating about hoop 1. As a result, subconductors 42 and 44 are able to twist during heavy winds which varies the air flow pattern over the subconductors and reduces galloping. In addition, by twisting the subconductors with spacer-damper 40 in opposition to rotation of the bundled subconductors caused by galloping, energy is removed from the galloping motion resulting in a diminished gallop amplitude.

Spacer-damper 40 preferably spaces subconductors 42 and 44 about 22 inches apart from each other in comparison to prior art spacer-dampers which typically space subconductors only 18 inches apart. Increasing the spacing of subconductors to about 22 inches increases the moment of inertia or stiffness of the bundled subconductors about 50% which also improves the resistance to galloping of the subconductors in high winds. Furthermore, the 22 inch spacing reduces exposure to sub-span oscillation, bundle torque upset, loading of spacer-damper units by short circuit currents and inductive reactance. This improves system stability, reduces voltage drop and increases line capacity by at least 5%. Although spacer-damper 40 preferably spaces the subconductors 22 inches apart, any spacing within the range from about 22 to 24 inches is suitable. Alternatively, spacer-damper 40 can also be sized to space subconductors less than 22 inches apart or more than 24 inches apart. Also, the spacer-dampers depicted in FIGS. 1 and 3 can also be sized to space multiple subconductors 22-24 inches apart to provide improved properties.

When resisting aeolean vibration, spacer-damper 40 is capable of dissipating up to about 5 watts of power when rubber washers are inserted between clamps 46 and washers 7 and about 3.5 watts without rubber washers. The addition of rubber washers is not essential because the rubber washers increase power dissipation only in the mid-range and high-range vibration frequencies (about 45 Hz and 70 Hz).

Figure 6:
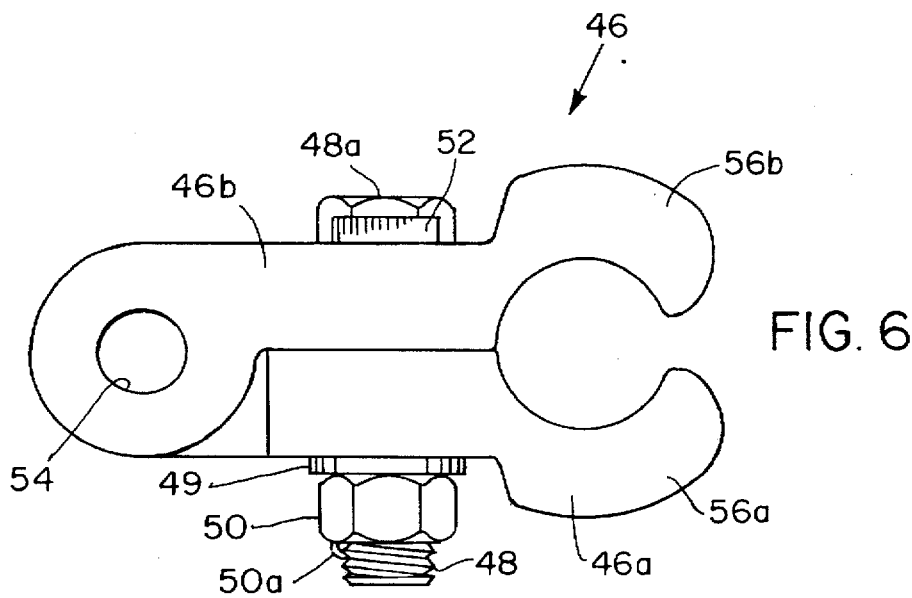
FIG. 6 is an enlarged side view of one of the clamps employed in the spacer damper of FIG. 5.

Referring to FIG. 6, clamp halves 46a and 46b include gripping jaws 56a and 56b, respectively, for gripping subconductors 42 and 44. Gripping jaws 56a and 56b have curved interior surfaces for gripping subconductors 42 and 44. The clamp halves 46a and 46b are mounted about hoop 1 through holes 54 which allow clamp halves 46a and 46b to pivot about hoop 1 as well slide along hoop 1. Gripping jaws 56a and 56b grip subconductors 42 and 44 when clamp halves 46a and 46b are tightened by bolts 48, lock washers 49 and lock nuts 50. Each lock nut 50 includes a lock wire 50a for engaging the threads of a bolt 48 to prevent loosening. Each clamp half 46b includes two stops 52 located on opposite sides of the head 48a of bolt 48 which prevents the head 48a from rotating when lock nut 50 is tightened. Clamps 46 are preferably made of aluminum but alternatively, can be made of other suitable metals such as steel. Additionally, clamps 46 can be replaced with other equivalent clamps that are slideable and rotatable about hoop 1. Furthermore, one stop 52 can be employed or stops 52 can be omitted.

Figure 3:
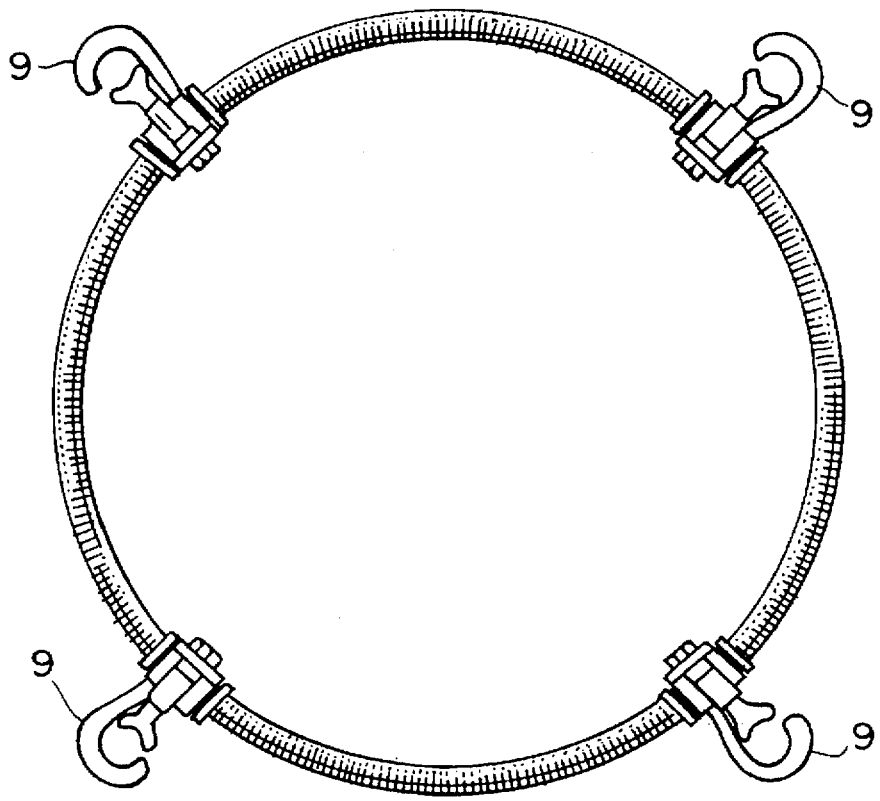
FIG. 3 illustrates the type of clamp that is used for UHV voltage higher than 620 kV.
Figure 4A:
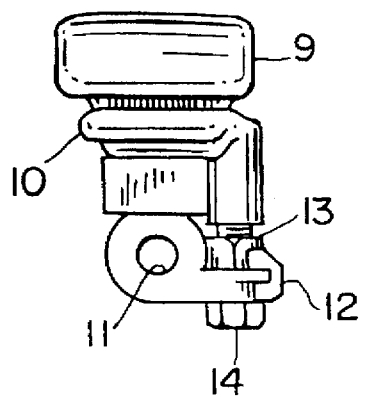
FIGS. 4A–4C illustrate the clamp components that are used for UHV voltage higher than 620 kV.
Figure 4B:
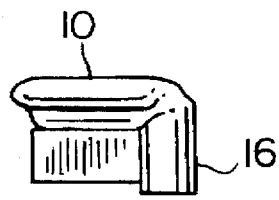
Figure 4C:
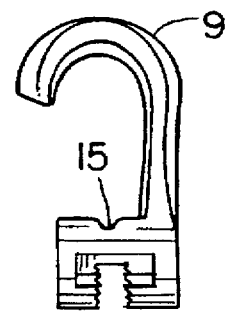

Referring to FIGS. 7 and 8, clamp 20 is a two bolt clamp which can be substituted for clamps 2A, 2B and 9 in FIGS. 1 and 3. Clamp 20 differs from clamp 9 in that clamp 20 includes two sets of bolts 72, retainers 80 and lock nuts 76. Clamp 20 includes a clamp body 63 having a mounting portion 64. Mounting portion 64 has a mounting hole 78 for mounting clamp 20 to hoop 1 (FIG. 1). Two flanges 65 extend from opposite sides of mounting portion 64. A J-shaped clamp arm 70 extends from mounting portion 64 to provide a cradle 68 for receiving a subconductor. The interior surface of cradle 68 is preferably curved but can alternatively be of other suitable shapes such as a V-shape. The J-shaped clamp arm 70 provides clamp body 63 with an entry way 71 to the interior surface of cradle 68 on the side of clamp body 63 opposite to clamp arm 70. Entry way 71 allows subconductors to be easily slipped into cradle 68 during installation.

Keeper 66 traps the subconductor received within cradle 68. The bottom surface of keeper 66 is preferably curved to conform to the round cross section of the subconductor. Alternatively, the bottom surface of keeper 66 can be of other suitable shapes such as a V-shape. Keeper 66 is clamped against the subconductors by bolts 72 which pass through flanges 65 of the mounting portion 64 of clamp body 63. Keeper 66 includes two bores 84. The ends of bolts 72 extend into bores 84 to prevent lateral movement of keeper 66. Stops 80 are optionally included on flanges 65 to prevent rotation of nuts 76 during installation. The two bolt design of clamp 20 allows subconductors to be more securely and uniformly clamped with clamp 20 than with clamps 2A, 2B and 9.

Referring to FIG. 9, the present invention also includes a suspension clamp 60 which is similar to clamp 20 depicted in FIGS. 7 and 8 but differs in that suspension clamp 60 is securable to an insulator 94 of a tower for supporting a subconductor 61. In order to secure suspension clamp 60 to insulator 94, a shackle 88 is first hung from eyelet 92 of insulator 94. A shear pin 90 is then employed to couple suspension clamp 60 to shackle 88. This arrangement allows movement of the suspension clamp 60 and subconductor 61 relative to insulator 94, thereby reducing stresses exerted on insulator 94 by subconductor 61 in high winds. An armor rod 62 is preferably fitted over subconductor 61 in the area of suspension clamp 60 to protect subconductor 61.

Referring to FIGS. 10 and 11, armor rod 62 and subconductor 61 are clamped within the cradle 68 of suspension clamp 60. Mounting hole 78 which passes through mounting portion 64, allows suspension clamp 60 to be mounted to shackle 88. Entry way 71 allows subconductor 61 to be easily slipped into cradle 68 during installation.

Keeper 66 traps the armor rod 62 and subconductor 61 within cradle 68. Lock washer 74 and lock nut 76 lock bolts 72 in position. Lock nuts 76 include lock wires 76a for locking nuts 76 in place. A hole 82 is provided within keeper 66 so that a cord 86 can be tied around suspension arm 70 and keeper 66 to prevent keeper 66 from being lost during installation. Since keeper 66 is tightened onto armor rod 62 by only two bolts, suspension clamp 60 is quickly and easily installed making it suitable for installation by helicopter.

Figure 12:
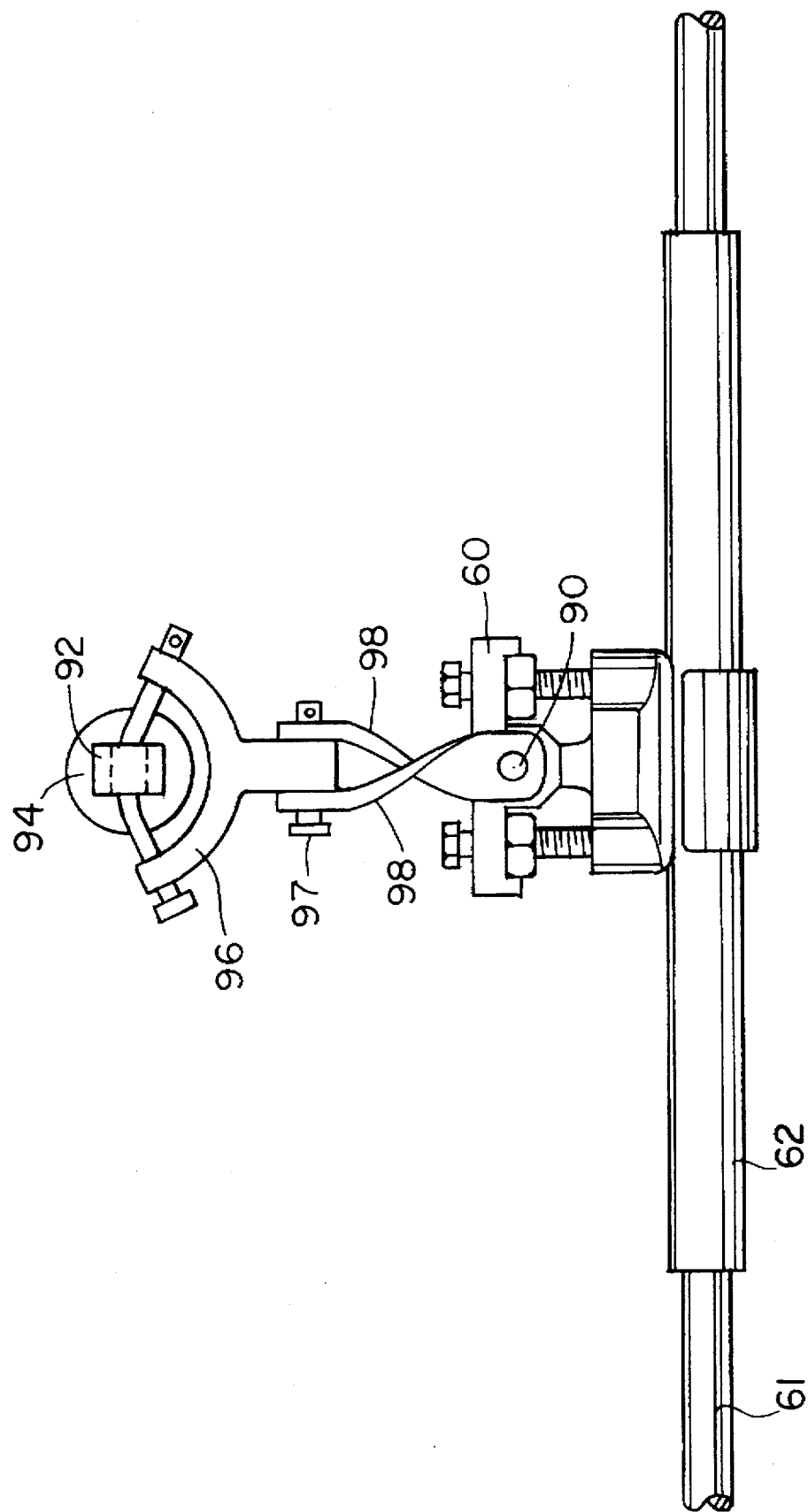
FIG. 12 is a side view of another preferred method of suspending the present invention suspension clamp from an insulator on a tower.

FIG. 12 depicts another preferred method of hanging suspension clamp 60 from insulator 94. A Y-clevis 96 is hung from eyelet 92. Two 90° twisted brackets 98 are coupled to suspension clamp 60 by pin 90 and are coupled to Y-clevis 96 by pin 97. This method is typically employed when shackles 88 of the correct size are not available. Additionally, other suitable methods can be employed for coupling suspension clamp 60 to eyelet 92 which allow movement of suspension clamp 60 relative to insulator 94.

Figure 13:
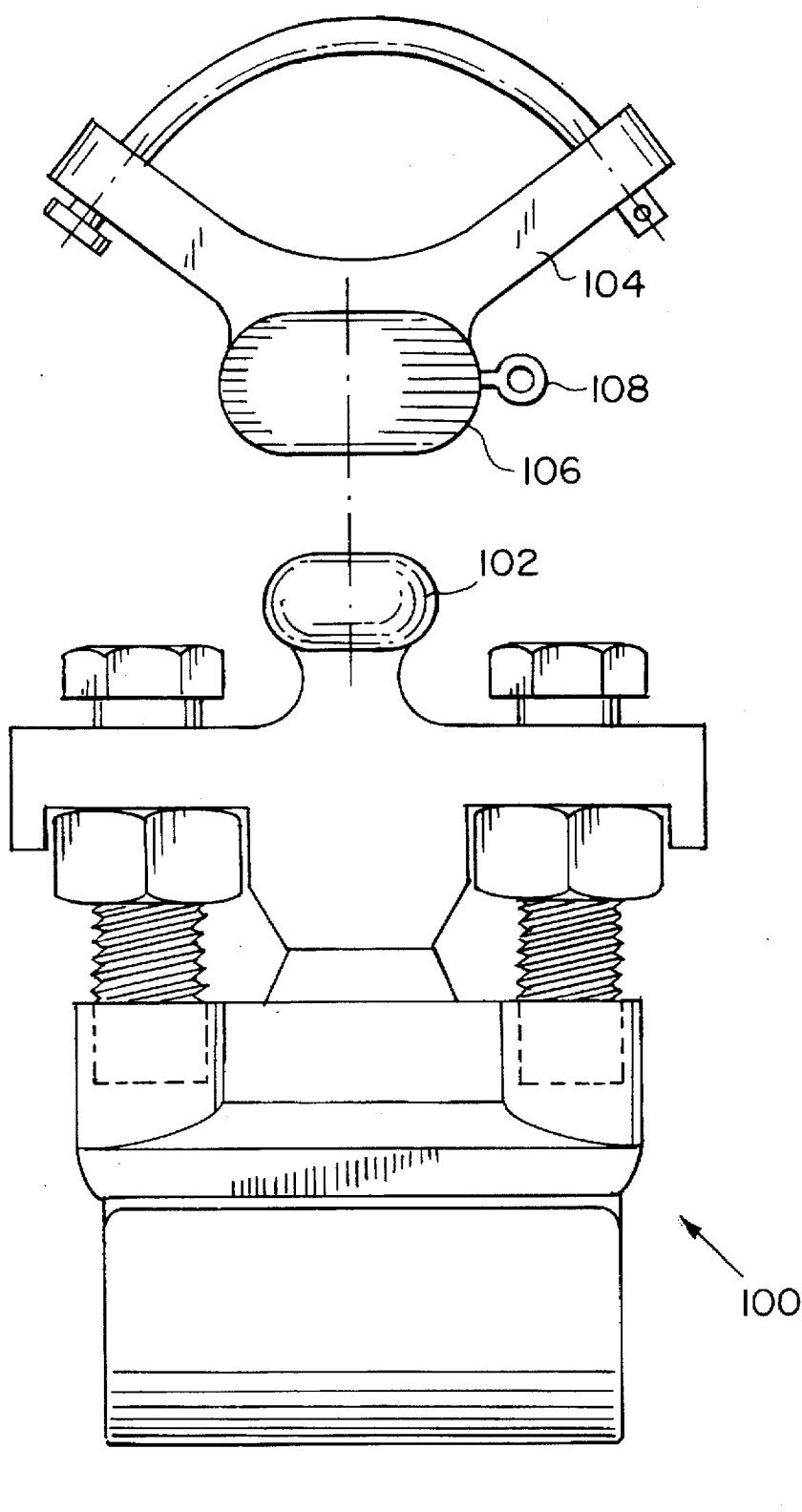
FIG. 13 is a side view of still another preferred method of suspending a suspension clamp.

FIG. 13 depicts still another preferred method of hanging a suspension clamp from an insulator. A Y-clevis 104 is hung from the eyelet of the insulator as in FIG. 12. Y-clevis 104 differs from Y-clevis 96 of FIG. 12 in that Y-clevis 104 includes a ball socket 106. Suspension clamp 100 couples to Y-clevis 104 and is similar to suspension clamp 60 but differs in that suspension clamp 100 includes a ball 102 that mates with socket 106. A locking mechanism 108 locks ball 102 within socket 106 while allowing articulation of the ball 102 within socket 106.

Equivalents

While this invention has been particularly shown and described with references to preferred embodiment thereof, it will be understood by those skilled in the art that various changes and form and details may be made therein without departing from the spirit and scope of the invention as defined by the appended claims.

What is claimed is:

1. A spacer-damper device for providing necessary spacing of two subconductors from each other comprising:

a hoop formed of rigid material;

first and second clamps spaced along the hoop approximately opposite to each other for gripping the subconductors such that the hoop and the subconductors are positioned substantially along the same plane, the clamps being capable of sliding along the hoop and rotating about the hoop; and first and second springs about the hoop and between the clamps for separating the clamps along the hoop.

2. The spacer-damper of claim 1 in which the spacer damper provides attachment of the subconductors to one other while allowing articulation.

3. The spacer-damper of claim 1 further comprising steel washers about the hoop and sandwiched between each spring and clamp.

4. The spacer-damper of claim 1 in which the subconductors are spaced about 22 inches apart.

5. The spacer-damper of claim 1 in which the hoop and the subconductors lie along a horizontal plane.

6. A method of spacing two subconductors relative to each other comprising the steps of:

gripping each subconductor with first and second clamps that are spaced along a rigid hoop approximately opposite to each other such that the hoop and subconductors are positioned substantially along the same plane, the clamps being capable of sliding along the hoop and rotating about the hoop; and separating the clamps from each other along the hoop with first and second springs which are positioned about the hoop and spaced between the clamps.

7. The method of claim 6 further comprising the step of resisting rotation of each clamp by friction forces on the clamp provided by positioning a washer between each clamp and spring.

8. The method of claim 7 further comprising the step of dampening lateral movement of each subconductor by rotation of the corresponding clamp about the hoop with the rotation of the corresponding clamp being resisted by the friction forces exerted on the corresponding clamp.

9. The method of claim 6 further comprising the step of dampening longitudinal movement of each subconductor by a sliding action of the corresponding clamp about the hoop, the sliding of the corresponding clamp being resisted by the springs spaced between the clamps.

10. The method of claim 9 in which the longitudinal movement is in directions tangential to the hoop.

11. The method of claim 9 in which the longitudinal movement is in directions along the circumference of the hoop.

12. The method of claim 6 further comprising the step of spacing the subconductors about 22 inches apart.

\* \* \* \* \*